(12) United States Patent
Gebert et al.

(10) Patent No.: US 9,221,332 B2
(45) Date of Patent: Dec. 29, 2015

(54) PLASTIC FUEL TANK

(75) Inventors: Klaus Gebert, Willich (DE); Axel Wagner, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 432 days.

(21) Appl. No.: 12/727,396

(22) Filed: Mar. 19, 2010

(65) Prior Publication Data
US 2010/0237080 A1    Sep. 23, 2010

(30) Foreign Application Priority Data
Mar. 19, 2009   (DE) .......................... 10 2009 013 514

(51) Int. Cl.
*B60K 15/00*    (2006.01)
*B60K 15/03*    (2006.01)

(52) U.S. Cl.
CPC . *B60K 15/03177* (2013.01); *B60K 2015/03059* (2013.01)

(58) Field of Classification Search
CPC ................ B60K 15/03177; B60K 2015/03059
USPC ........... 220/905, 627, 645, 653, 62.18, 62.22, 220/562, 563
See application file for complete search history.

(56) References Cited

U.S. PATENT DOCUMENTS

| | | | |
|---|---|---|---|
| 2,082,836 A * | 6/1937 | Kjekstad .................... 114/79 W |
| 2,763,586 A * | 9/1956 | Noyes ........................... 428/140 |
| 3,147,858 A * | 9/1964 | Meister, Jr. et al. .......... 206/449 |
| 3,246,789 A | 4/1966 | Progler |
| 3,675,809 A * | 7/1972 | McGrew et al. ......... 220/560.13 |
| 3,691,002 A * | 9/1972 | Blandy ......................... 428/182 |
| 3,779,420 A * | 12/1973 | Knaus ........................... 220/4.14 |
| 3,924,773 A * | 12/1975 | Wilkinson .................... 220/88.3 |
| 4,865,220 A * | 9/1989 | Wiegand .................... 220/567.1 |
| 4,900,333 A * | 2/1990 | Bos ............................. 48/197 R |
| 4,923,081 A * | 5/1990 | Weaver et al. ................. 220/645 |
| 5,085,343 A * | 2/1992 | Scarr ......................... 220/560.1 |
| 5,129,544 A | 7/1992 | Jacobson et al. |
| 5,167,352 A * | 12/1992 | Robbins ...................... 220/62.2 |
| 5,522,340 A * | 6/1996 | Skogman ...................... 114/357 |
| 5,547,096 A * | 8/1996 | Kleyn .......................... 220/4.14 |
| 5,829,625 A * | 11/1998 | Imagawa .................... 220/567.1 |

(Continued)

FOREIGN PATENT DOCUMENTS

AT         370226 B    3/1983
CN       2398129 Y    9/2000
(Continued)

OTHER PUBLICATIONS

PCT International Search Report dated May 28, 2010, received in corresponding PCT Application No. PCT/EP2010/001230, 3 pgs.

(Continued)

*Primary Examiner* — Fenn Mathew
*Assistant Examiner* — Don M Anderson
(74) *Attorney, Agent, or Firm* — Grossman Tucker Perreault & Pfleger, PLLC

(57) ABSTRACT

The invention relates to a plastic fuel tank (1) for motor vehicles having at least one tank wall (2) surrounding at least one fuel volume, wherein the tank wall (2) is provided at least in a certain area or certain areas with means for increasing flexural rigidity in the form of two-dimensionally extended reinforcing layers (3) connected materially and/or positively thereto (FIG. 1).

6 Claims, 1 Drawing Sheet

(56) References Cited

U.S. PATENT DOCUMENTS

| | | | |
|---|---|---|---|
| 6,047,747 A * | 4/2000 | Bowen et al. | 141/231 |
| 6,491,180 B2 * | 12/2002 | Distelhoff et al. | 220/562 |
| 6,612,458 B2 | 9/2003 | Balzer et al. | |
| 6,661,339 B2 * | 12/2003 | Muirhead | 340/505 |
| 6,719,163 B1 * | 4/2004 | Delbarre et al. | 220/562 |
| 7,975,869 B2 | 7/2011 | Park | |
| 2002/0051856 A1 | 5/2002 | Delbarre | |
| 2006/0032538 A1 * | 2/2006 | Park | 137/590 |
| 2007/0151983 A1 * | 7/2007 | Patel et al. | 222/95 |

FOREIGN PATENT DOCUMENTS

| | | |
|---|---|---|
| CN | 2647639 Y | 10/2004 |
| DE | 4221766 | 1/1993 |
| DE | 69304104 | 1/1997 |
| DE | 20110549 | 4/2002 |
| DE | 10149185 A1 | 10/2003 |
| DE | 102006037062 | 2/2008 |
| DE | 102007026817 | 10/2008 |
| FR | 2765633 A1 | 1/1999 |
| GB | 2265343 | 9/1993 |
| JP | 2006327465 A | 12/2006 |

OTHER PUBLICATIONS

English Translation of the International Preliminary Report on Patentability issued Sep. 20, 2011, received in PCT Application No. PCT/EP2010/001230, 6 pgs.

English translation of Japanese Office Action/Notification of Reasons for Refusal mailed Oct. 22, 2013, received in related Japanese Patent Application No. JP2012-500102, pp. 1-4.

* cited by examiner

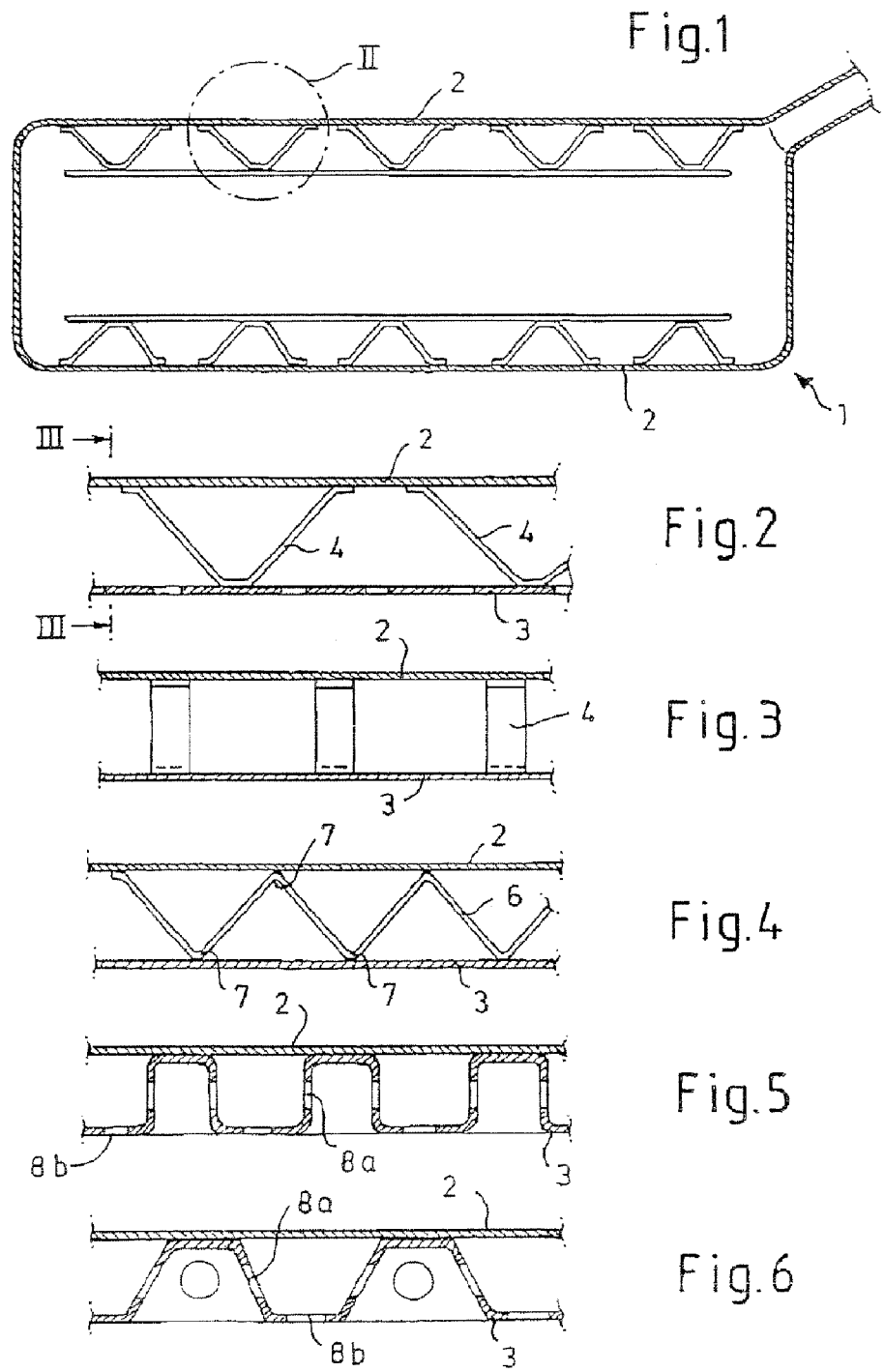

PLASTIC FUEL TANK

The invention relates to a plastic fuel tank for motor vehicles having at least one tank wall surrounding at least one fuel volume.

Plastic fuel tanks of this kind have proven particularly suitable for use in motor vehicles since, by virtue of their manufacture, they can have complex contours and a plurality of intercommunicating tank volumes; in particular, plastic fuel tanks of this kind can be matched optimally to the installation circumstances in a motor vehicle.

On motor vehicles operated with diesel or spark-ignition engines, fuel tank systems are generally operated in a depressurized manner, i.e. pressure equalization with respect to atmosphere takes place via at least one fuel vapor filter communicating with the tank volume via a device for operational venting. The fuel vapor filters that are customarily used are designed as activated carbon filters. While the motor vehicle is stationary or during refueling as well, for example, the said filters are charged with gaseous hydrocarbons, whereas, during the operation of the internal combustion engine, they are discharged through reverse purging by means of combustion air drawn in by the engine. It will be understood that the adsorptive capacity of a fuel vapor filter is determined not least by its size. In the case of motor vehicles which are driven both by electric motor and by means of a combustion engine, reverse purging of the fuel vapor filter is possible only during the operation of the internal combustion engine by the very nature of the system. Accordingly, it would theoretically be necessary to increase the charging capacity of the fuel vapor filter by a corresponding amount and this entails a larger overall volume. This is not normally desirable. As an alternative, it is possible to reduce the vapor pressure gradient in the fuel tank, ensuring that the fuel has less of a tendency to make a transition from the liquid phase to the gas phase. This is achieved, for example, by constructing the fuel tank as a pressure vessel, i.e. that it is hermetically sealed at a given differential pressure relative to the ambient pressure. This means that the fuel tank must withstand relatively high loads, especially as the rigidity of plastic tanks depends, inter alia, on the ambient temperature, and the possibility that a fuel tank of a motor vehicle will be exposed to relatively high ambient temperatures cannot be excluded under certain circumstances.

Reinforcing measures for plastic fuel tanks are fundamentally known but these are provided in the form of internal braces or supports and considerably reduce the volume of the fuel tank. Moreover, the insertion of such braces in the fuel tank is an involved process.

The object on which the invention is based is to improve a fuel tank of the type stated at the outset in this respect.

This object is achieved by a plastic fuel tank for motor vehicles having at least one tank wall surrounding at least one fuel volume, the plastic fuel tank being distinguished by the fact that the tank wall is provided at least in a certain area or certain areas with means for increasing flexural rigidity in the form of two-dimensionally extended reinforcing layers connected materially and/or positively thereto.

This makes it possible to partially reinforce the plastic fuel tank both from outside and from inside in such a way that its flexural rigidity is increased without impairing the volume it can hold. Such reinforcing layers could be provided both on the outside and on the inside of the tank wall. It is particularly advantageous that such reinforcing layers can be provided selectively at particularly highly stressed points of the fuel tank.

In a preferred variant of the plastic fuel tank according to the invention, sheets or strips of thermoplastic which extend approximately parallel to the tank wall to be reinforced are provided as reinforcing layers. Such sheets or strips can be designed to match approximately the contour of the fuel tank in the areas to be reinforced.

For example, the reinforcing layers can be attached to the tank wall to be reinforced at a distance from the latter, at least in a certain area or certain areas, with the aid of spacers.

In the area to be reinforced, the tank wall can, for example, be provided with projections, knobs or dome-shaped bulges which are riveted, welded or latched to a reinforcing layer.

As an alternative, the reinforcing layer can be provided with projections, knobs or dome-shaped bulges which are welded, riveted or latched to the tank wall.

By means of such reinforcing layers, which are connected to the tank wall with a clearance at certain points, the flexural rigidity of the tank wall is reinforced in accordance with the principle of operation of corrugated cardboard. The knobs, dome-shaped bulges or projections are used to produce material bridges between a tank wall and a reinforcing layer, which bridges significantly increase flexural rigidity.

As an alternative, provision can be made in each case for a reinforcing layer to be connected to the tank wall via an intermediate layer.

In an expedient embodiment of the plastic fuel tank according to the invention, a corrugated sheet-like structure made of thermoplastic, the peaks of which are each welded and/or adhesively bonded to the tank wall and to the reinforcing layer, is provided as the intermediate layer.

The term "two-dimensionally extended product" or "sheet-like structure" in the sense in which it is used in the invention is intended to mean substantially flat elements in sheet form.

In an expedient variant of the plastic fuel tank according to the invention, it is possible for the reinforcing layer to be provided with apertures. These apertures can be used to install components to be fixed in the fuel tank. The apertures in and of themselves have the advantage that they absorb the swash and impact energy of the fuel moved by the vehicle dynamics and hence act as swash- and surge-inhibiting elements.

On the other hand, it is also possible for the interspace between the reinforcing layers and the tank wall to be designed to allow fuel to flood through or flow through. It is self-evident that these effects can only be achieved if the reinforcing layers are arranged within the fuel tank. Fundamentally, it is possible to provide the reinforcing layers on the inside and/or the outside of the tank wall.

The plastic fuel tank according to the invention is expediently designed in such a way that the said tank has means for operational venting and for refuel venting, a device for operational venting comprising at least one operational venting valve with a pressure-holding function, by means of which the volume of the fuel tank can be kept within a predetermined differential pressure range relative to the ambient pressure.

A number of illustrative embodiments of the invention are explained below with reference to the attached drawings, in which:

FIG. 1 shows a schematic representation of the plastic fuel tank in accordance with the invention in section, FIG. 2 shows an enlarged representation of the detail II in FIG. 1, FIG. 3 shows a sectional view along the lines III-III in FIG. 2, FIG. 4 shows an alternative embodiment of the fixing of the reinforcing layer on the tank wall, FIG. 5 shows a further alternative embodiment of a reinforcing layer provided on the tank wall, and FIG. 6 shows a third variant of the reinforcing layer provided on the tank wall in a manner in accordance with the invention.

FIG. 1 shows a plastic fuel tank 1 in accordance with the invention in a greatly simplified sectional view, the size ratios in FIG. 1 being represented in a manner which is exaggeratedly not to scale.

The plastic fuel tank 1 is expediently designed as an extrusion blow-molded plastic fuel tank obtained by extrusion blow-molding of preforms in the form of webs or sheets. These preforms in the form of webs or sheets were shaped in a multi-stage operation in a three-part blow-molding die to give a closed one-piece plastic tank.

During the production of a plastic fuel tank of this kind, there is in principle the possibility of positioning built-in and attached parts built-in and/or attached parts in a relatively simple manner on the inner wall of the half-shells defining the subsequent contour of the fuel tank during the molding of the latter.

The plastic fuel tank 1 represented in the drawing is also represented in a greatly simplified manner as regards its contour. A person skilled in the art will be familiar with the fact that a plastic fuel tank 1 of this kind can have a very complex contour with a plurality of intercommunicating component volumes.

For partial reinforcement of the tank wall 2 in the illustrative embodiments described, two reinforcing layers 3 are fixed on the tank wall 2 within the volume enclosed by the tank wall 2, more specifically at a distance from the tank wall 2, as will be explained in detail below. The distance between the reinforcing layers 3 and the tank wall 2 is represented on an exaggerated scale. In the variant of the plastic fuel tank shown in FIG. 1, the reinforcing layers 3 are represented in such a way that they extend essentially over the entire bottom side and top side of the tank. However, the invention is to be interpreted such that these reinforcing layers can be of sheet- or strip-shaped design and be provided only at certain points of the plastic fuel tank that require reinforcement. These reinforcing layers 3 may have been applied directly to the tank wall 2 of the plastic fuel tank 1. In the illustrative embodiments described, however, they are arranged at a distance from the tank wall 2, more specifically in such a way that they are only in point contact with the tank wall 2, such that overall the flexural rigidity of the tank wall 2 is significantly increased in the area concerned.

In the illustrative embodiment represented in FIGS. 1 to 3, V-shaped profiles 4 are provided between the reinforcing layer 3 and the tank wall 2, the said V-shaped profiles not being connected to one another and giving to the interspace 5 between the reinforcing layers 3 and the tank wall 2 a honeycomb structure through which fuel can flood. The profiles 4 can be relatively more flexible than the reinforcing layer 3. The interspace 5 communicates with the remainder of the tank volume in such a way that the arrangement additionally acts as a swash- or surge-inhibiting element within the plastic fuel tank 1. The opening sides of the approximately V-shaped profiles 4 are turned towards the tank wall 2 in the interior. The said profiles are arranged in such a way that, in terms of mechanics, a kind of "corrugated-cardboard effect" is produced.

An alternative embodiment of the plastic fuel tank is represented in FIG. 4. There, a corrugated intermediate layer 6 is arranged between the reinforcing layer 3 and the tank wall 2, the said intermediate layer likewise being composed of a thermoplastic, the peaks 7 of the corrugated structure each being welded to the tank wall 2 and the reinforcing layer 3. The intermediate layer 6 is less flexurally rigid than the tank wall 2 and the reinforcing layer 3, as a result of which the flexural rigidity of the tank wall 2 overall is increased in one direction of bending but remains unchanged in a direction transverse thereto.

In this way, a directional increase in flexural rigidity can be achieved through selective alignment of the structure shown in FIG. 4 at particular points of the tank wall.

A further embodiment of the plastic fuel tank 1 in accordance with the invention is represented in FIG. 5. There, the reinforcing layer 3 is designed directly as a ribbed profile and is welded linearly to the tank wall 2. As an alternative, it is also possible for individual dome-shaped raised portions of the reinforcing layer 3 to be welded to the tank wall 2 instead of longitudinally or transversely extending ribs.

In a further variant (not shown) of the plastic fuel tank 1 in accordance with the invention, the intermediate layer 6 can have a cross-sectional profile corresponding to that in FIG. 5, for example.

FIG. 5 shows a ribbed reinforcing layer 3, which is provided with apertures 8a, 8b. The apertures 8a extend approximately transversely to the tank wall 2 and serve as passages for fuel, the primary purpose of this being to dissipate the surge energy of the fuel overflowing them. The apertures 8b, which extend approximately parallel to the tank wall, self-evidently allow fuel to flood through as well, but these can be used to install internal fittings to be provided in the plastic fuel tank 1.

Finally, FIG. 6 shows a further variant of the design of a reinforcing layer 3, which can have either longitudinal or transverse ribs with a trapezoidal profile or can be provided with corresponding dome-shaped projections or raised portions. These can likewise be provided with apertures 8a, 8b.

As an alternative, it is possible to rivet and/or weld a reinforcing layer 3 thermally to the tank wall at discrete points as an approximately planar, two-dimensionally extended structure. The reinforcing layer 3 can also be provided with stud-shaped projections, which are welded to the tank wall 2 during the molding of the plastic fuel tank. If the reinforcing layers 3 are attached to the outside of the plastic fuel tank 1, the reinforcing layers can have been connected to the tank wall 2 at the second heat stage, by butt-welding with heat reflectors, friction welding or the like, for example. As an alternative, the use of an adhesion promoter is conceivable.

LIST OF REFERENCE SIGNS

1 Plastic fuel tank
2 Tank wall
3 Reinforcing layers
4 Profiles
5 Interspace
6 Intermediate layer
7 Peak
8a, 8b Apertures

What is claimed is:

1. A plastic fuel tank having a volume for containing fuel for a motor vehicle comprising:
 a tank wall arranged to provide a pressure vessel which is hermetically sealed at a given differential pressure relative to ambient pressure, wherein the tank wall is reinforced only in a certain area or certain areas such that only a portion of the tank wall is reinforced without substantially impairing said volume, wherein the tank wall is reinforced with means to increase flexural rigidity in a form of at least one two-dimensionally extended reinforcing layer connected materially and/or positively to the tank wall; and wherein the reinforcing layer is connected to the tank wall via a thermoplastic intermediate layer and forms an interspace between said reinforcing layer and said tank wall and comprising a corrugated sheet structure of V-shaped profiles made of thermoplastic and having a plurality of peaks, wherein the peaks are welded and/or adhesively bonded to the tank wall and to the reinforcing layer and wherein fuel can flow through said interspace; and wherein the reinforcing layer and intermediate layer provide a directional increase in flexural rigidity of the tank wall such that flexural rigidity of the tank wall is increased in a first direction relative to a second direction through selective alignment of the intermediate layer at selected locations of said tank wall; and wherein the tank wall is formed by half-shells; and wherein the half-shells comprise half-shell walls joined directly to one another to form the tank wall without the reinforcing layer or intermediate layer disposed between the joined half-shell walls.

2. The plastic fuel tank according to claim 1, wherein the reinforcing layer comprises one or more sheets and/or strips of thermoplastic which extend approximately parallel to the tank wall being reinforced.

3. The plastic fuel tank according to claim 1, wherein the reinforcing layer is connected to the tank wall being reinforced at a distance from the tank wall by the intermediate layer.

4. The plastic fuel tank according to claim 1, wherein the reinforcing layer is provided on the inside of the tank wall.

5. The plastic fuel tank according to claim 1, wherein the intermediate layer is less flexurally rigid than the tank wall and the reinforcing layer.

6. The plastic fuel tank according to claim 1, wherein the directional increase in flexural rigidity is achieved through alignment of the corrugated structure on the tank wall.

* * * * *